US012686434B2

(12) United States Patent
Kim

(10) Patent No.: US 12,686,434 B2
(45) Date of Patent: Jul. 21, 2026

(54) APPARATUS AND METHOD FOR CONTROLLING MOTOR-DRIVEN POWER STEERING SYSTEM

(71) Applicant: HYUNDAI MOBIS CO., LTD., Seoul (KR)

(72) Inventor: Tae Hong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 306 days.

(21) Appl. No.: 18/431,149

(22) Filed: Feb. 2, 2024

(65) Prior Publication Data

US 2025/0074502 A1    Mar. 6, 2025

(30) Foreign Application Priority Data

Aug. 31, 2023    (KR) ......................... 10-2023-0115346

(51) Int. Cl.
*B62D 5/04*        (2006.01)

(52) U.S. Cl.
CPC ........... *B62D 5/0484* (2013.01); *B62D 5/049* (2013.01)

(58) Field of Classification Search
CPC .... B62D 5/046; B62D 5/0463; B62D 5/0481; B62D 5/0484; B62D 5/049; B62D 15/0235
See application file for complete search history.

(56) References Cited

U.S. PATENT DOCUMENTS

| | | | |
|---|---|---|---|
| 2002/0053481 A1* | 5/2002 | Itakura | B62D 5/0463 180/443 |
| 2003/0168276 A1* | 9/2003 | Kimura | B62D 5/049 180/446 |

| | | | |
|---|---|---|---|
| 2007/0233345 A1* | 10/2007 | Endo | B62D 5/049 701/41 |
| 2008/0023255 A1* | 1/2008 | Colosky | B62D 15/0215 180/444 |
| 2010/0299027 A1* | 11/2010 | Aoki | G01L 5/221 701/42 |
| 2015/0127221 A1* | 5/2015 | Pugsley | B62D 6/003 701/41 |
| 2015/0375776 A1* | 12/2015 | Hong | B62D 5/0463 701/43 |
| 2017/0101126 A1* | 4/2017 | Kim | B62D 5/0493 |

(Continued)

FOREIGN PATENT DOCUMENTS

| | | | |
|---|---|---|---|
| JP | 2007331623 A | * | 12/2007 |
| JP | 2010179848 A | * | 8/2010 |
| KR | 10-2022-0144460 A | | 10/2022 |

*Primary Examiner* — John M Zaleskas

(74) *Attorney, Agent, or Firm* — Morgan, Lewis & Bockius LLP

(57)                ABSTRACT

Disclosed herein are an apparatus and method for controlling a motor-driven power steering system. The apparatus for controlling a motor-driven power steering system includes an input/output interface connected to a motor angle sensor, a steering angle sensor, and a position controller, and a processor connected to the input/output interface, wherein, when a failure occurs in the motor angle sensor, the processor calculates a sum value of a result value obtained by applying a first weight value to a motor angle of a driving motor output from the motor angle sensor and a result value obtained by applying a second weight value to a steering angle of a steering wheel output from the steering angle sensor and feed the sum value back to a position controller.

19 Claims, 5 Drawing Sheets

(56)        References Cited

U.S. PATENT DOCUMENTS

2018/0178832 A1*   6/2018  Minaki  .............. B62D 15/0235
2018/0297630 A1*  10/2018  Kim  ...................... B62D 6/002
2019/0193776 A1*   6/2019  Tsubaki  ............ B62D 15/0235
2019/0389504 A1*  12/2019  Itoh  ...................... B62D 5/0484
2021/0354757 A1*  11/2021  Kim  ......................... B60Q 9/00
2022/0135116 A1*   5/2022  Won  ...................... B62D 5/046
                                                           701/42
2024/0253694 A1*   8/2024  Lee  ................... B62D 15/0235
2024/0383527 A1*  11/2024  Fujimoto  ............ B62D 5/0484

* cited by examiner

FIG. 3

APPARATUS AND METHOD FOR CONTROLLING MOTOR-DRIVEN POWER STEERING SYSTEM

This application claims priority from and the benefit of Korean Patent Application No. 10-2023-0115346 filed on Aug. 31, 2023, which is hereby incorporated by reference for all purposes as if set forth herein.

BACKGROUND

Field

Exemplary embodiments of the present disclosure relate to an apparatus and method for controlling a motor-driven power steering system, and more specifically, to an apparatus and method for controlling a motor-driven power steering system that can perform stable steering control of a vehicle even when a failure occurs in a motor angle sensor.

Discussion of the Background

A motor-driven power steering system including a position controller, a speed controller, a current controller, and a driving motor, and each controller calculates a command value on the basis of an error between a sensed value measured through a sensor and a command value and controls an electric motor according to the calculated command value.

FIG. 1 is an exemplary diagram illustrating an R-type motor-driven power steering system. As shown in FIG. 1, the motor-driven power steering system typically performs position control on a driving motor on the basis of a motor angle of the driving motor, which is detected through a motor angle sensor, and when a failure occurs in the motor angle sensor, it is necessary to replace the motor angle sensor with another device or method.

Recently, a technology is being developed to replace the motor angle sensor through a steering angle sensor when the failure occurs in the motor angle sensor. However, the existing method has a problem in that a vibration occurs or steering control becomes unstable in the process of replacing the motor angle sensor through the steering angle sensor.

The related art of the present disclosure is disclosed in Korean Patent Laid-Open Application No. 10-2022-0144460 (published on Oct. 27, 2022).

SUMMARY

Various embodiments are directed to an apparatus and method for controlling a motor-driven power steering system, which stably switch from motor angle-based steering control to steering angle-based steering control when a failure occurs in a motor angle sensor.

In an embodiment, an apparatus for controlling a motor-driven power steering system may include an input/output interface connected to a motor angle sensor, a steering angle sensor, and a position controller, and a processor connected to the input/output interface, wherein, when a failure occurs in the motor angle sensor, the processor calculates a sum value of a result value obtained by applying a first weight value to a motor angle of a driving motor output from the motor angle sensor and a result value obtained by applying a second weight value to a steering angle of a steering wheel output from the steering angle sensor and feed the sum value back to a position controller.

In the present disclosure, the input/output interface may be connected to a speed controller, and when the failure occurs in the motor angle sensor, the processor may calculate a sum value of a result value obtained by applying the first weight value to a motor angle speed of the driving motor output from the motor angle sensor and a result value obtained by applying the second weight value to a steering angle speed of the steering wheel output from the steering angle sensor and feed the sum value back to the speed controller.

In the present disclosure, an initial value of the first weight value may be one, and the processor may gradually reduce the first weight value until the first weight value becomes zero.

In the present disclosure, an initial value of the second weight value may be zero, and the processor may gradually increase the second weight value until the second weight value becomes one.

In the present disclosure, the processor may set the first weight value and the second weight value such that the sum of the first weight value and the second weight value may be one.

In the present disclosure, the processor may set change amounts of change per unit time for the first and second weight values on the basis of the steering angle speed of the steering wheel.

In the present disclosure, the processor may set the change amount per unit time to be larger as the steering angle speed of the steering wheel increases.

In the present disclosure, when a failure does not occur in the motor angle sensor, the motor angle of the driving motor output from the motor angle sensor may be fed back to the position controller, and the motor angle speed of the driving motor output from the motor angle sensor may be fed back to the speed controller.

In an embodiment, a method of controlling a motor-driven power steering system may include when a failure occurs in a motor angle sensor, calculating a first result value by applying a first weight value to a motor angle of a driving motor output from the motor angle sensor; calculating a second result value by applying a second weight value to a steering angle of a steering wheel output from a steering angle sensor; and calculating a sum value of the first and second result values and feeding the sum value back to the position controller.

BRIEF DESCRIPTION OF THE DRAWINGS

FIG. 3 is a block diagram illustrating a processor according to one embodiment of the present disclosure.

DETAILED DESCRIPTION OF THE ILLUSTRATED EMBODIMENTS

Figure 1:
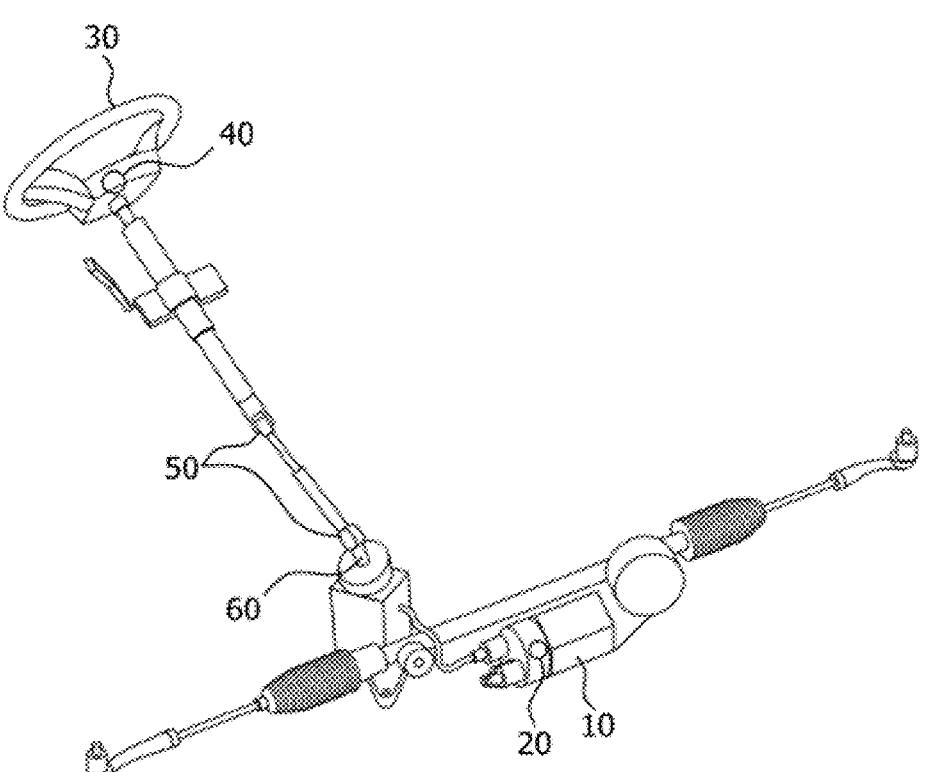
FIG. 1 is an exemplary diagram illustrating a motor-driven power steering system.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, an apparatus and method for controlling a motor-driven power steering system according to embodiments of the present disclosure will be described in detail with reference to the accompanying drawings. In the following description, thicknesses of lines and sizes of components shown in the drawings may be exaggerated for clarity and convenience of explanation. In addition, the terms described below are defined in consideration of the functions of the present disclosure, and these terms may be varied according to the intent or custom of a user or an operator. Therefore, the definitions of the terms used herein should follow contexts disclosed herein.

Figure 2:
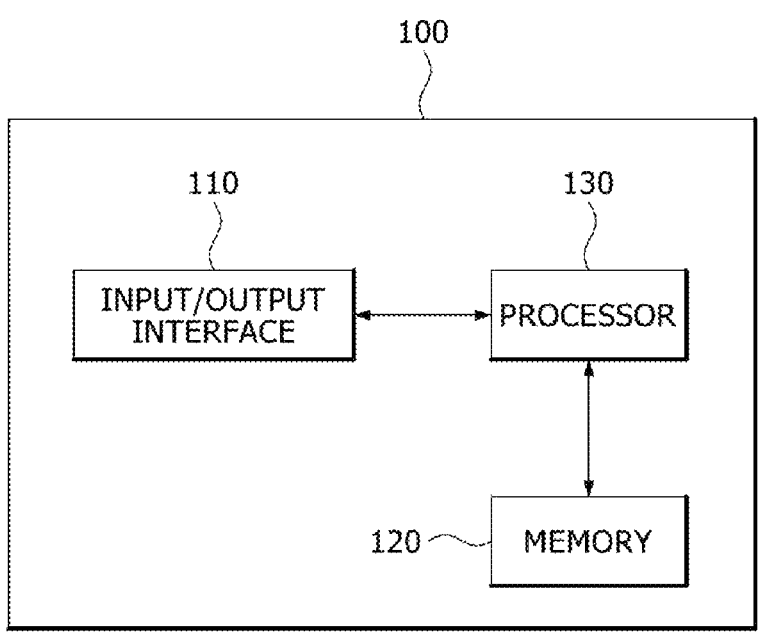
FIG. 2 is a block diagram illustrating an apparatus for controlling a motor-driven power steering system according to one embodiment of the present disclosure.
Figure 4:
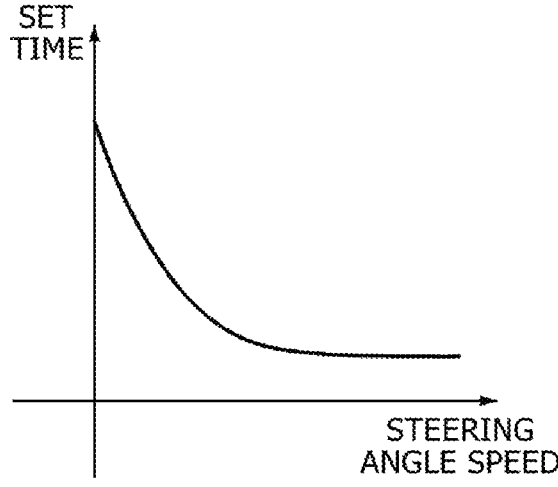
FIG. 4 is an exemplary diagram illustrating relationship information on a setting time according to a steering angle speed.

FIG. 2 is a block diagram illustrating an apparatus for controlling a motor-driven power steering system according to one embodiment of the present disclosure, and FIG. 4 is an exemplary diagram illustrating relationship information on a setting time according to a steering angle speed.

Referring to FIG. 2, an apparatus 100 for controlling a motor-driven power steering system according to one embodiment of the present disclosure may include an input/output interface 110, a memory 120, and a processor 130. Components included in the apparatus 100 for controlling a motor-driven power steering system may be connected through a common bus. Each component may be connected through an individual interface or an individual bus rather than the common bus based on the processor 130. The apparatus 100 for controlling a motor-driven power steering system according to one embodiment of the present disclosure may further include various components in addition to the components shown in FIG. 2, or some of the components may be omitted. The apparatus 100 for controlling a motor-driven power steering system according to one embodiment of the present disclosure may be applied to an autonomous vehicle, but the present disclosure is not limited thereto.

The input/output interface 110 may receive data from an external component and output the received data to the processor 130 which will be described below. According to one embodiment, the input/output interface 110 may be connected to a motor angle sensor 20, which detects a motor angle and a motor angle speed of a driving motor 10 provided in the motor-driven power steering system, and may receive information on the motor angle and the motor angle speed of the driving motor 10, which is output from the motor angle sensor 20. According to one embodiment, the input/output interface 110 may be connected to a steering angle sensor 40, which detects a steering angle and a steering angle speed of a steering wheel 30, and may receive information on the steering angle and the steering angle speed of the steering wheel 30, which is output from the steering angle sensor 40. According to one embodiment, the input/output interface 110 may be connected to an external device configured to detect a failure of the motor angle sensor 20 and may receive a failure signal of the motor angle sensor 20 output from the external device. The external device may be configured to output a logic high signal when a failure occurs in the motor angle sensor 20 and to output a logic low signal when the failure does not occur in the motor angle sensor 20.

The input/output interface 110 may output a result calculated by the processor 130 to an external component. According to one embodiment, the input/output interface 110 may be connected to a position controller 200 and a speed controller 300, which are provided in the motor-driven power steering system, and may feed the result calculated by the processor 130 back to the position controller 200 and the speed controller 300.

The memory 120 may store a variety of information required while the processor 130 operates. In addition, the memory 120 may store a variety of information calculated while the processor 130 operates.

The processor 130 may be operatively connected to the input/output interface 110 and the memory 120. The processor 130 may be implemented as a central processing unit (CPU), a micro controller unit (MCU), or a system on chip (SoC) and may be configured to control a plurality of hardware or software components connected to the processor 130 by executing an operating system or application, perform various data processing and computation, execute at least one command stored in the memory 120, and store the execution result in the memory 120.

When a failure does not occur in the motor angle sensor 20, the processor 130 may feed a motor angle of the driving motor 10, which is output from the motor angle sensor 20, back to the position controller 200, and feed a motor angle speed of the driving motor 10, which is output from the motor angle sensor 20, back to the speed controller 300. That is, in the present embodiment, in a normal situation in which the failure does not occur in the motor angle sensor 20, the motor angle and the motor angle speed of the driving motor 10 detected through the motor angle sensor 20 may be used as control parameters of the position controller 200 and the speed controller 300 to perform steering control.

When the failure occurs in motor angle sensor 20, the processor 130 may calculate a first sum value, which is the sum of a result value obtained by applying a first weight value to the motor angle of the driving motor 10 output from the motor angle sensor 20 and a result value obtained by applying a second weight value to the steering angle of steering wheel 30 output from steering angle sensor 40, and feed the calculated first sum value back to the position controller 200. In addition, the processor 130 may calculate a second sum value, which is the sum of a result value obtained by applying the first weight value to a motor angle speed of driving motor 10 output from motor angle sensor 20 and a result value obtained by applying the second weight value to a steering angle speed of a steering wheel 30 output from steering angle sensor 40, and feed the calculated second sum value back to the speed controller 300. The processor 130 may repeatedly perform the process of calculating the first and second sum values and feeding the first and second sum values back to the position controller 200 and the speed controller 300 at a preset period.

An initial value of the first weight value (a weight value at a time point when it is determined that the failure has occurred in the motor angle sensor) may be set to one, and the processor 130 may repeatedly perform a process of gradually reducing the first weight value until the first weight value becomes zero and calculating and feeding back the first and second sum values. In addition, an initial value of the second weight value may be set to zero, and the processor 130 may repeatedly perform a process of gradually increasing the second weight value until the second weight value becomes one and calculating and feeding back the first and second sum values. The processor 130 may set the first weight value and the second weight value such that the sum of the first weight value and the second weight value is always one.

According to one embodiment, the processor 130 may calculate the first sum value through the following equation 1 and calculate the second sum value through the following equation 2.

$$T_1 = K * A_1 + (1 - K) * B_1 \qquad \text{[Equation 1]}$$

$$T_2 = K * A_2 + (1 - K) * B_2 \qquad \text{[Equation 2]}$$

Here, $T_1$ may denote the first sum value, K may denote the first weight value, 1-K may denote the second weight value, $A_1$ may denote the motor angle, $B_1$ may denote the steering angle, $A_2$ may denote the motor angle speed, and $B_2$ may denote the steering angle speed.

In the present embodiment, when a failure occurs in the motor angle sensor 20, a first steering control method in which the motor angle of the driving motor 10 is used as a control parameter of the position controller 200 and the motor angle speed of the driving motor 10 is used as a control parameter of the speed controller 300 may be switched to a second steering control method in which the steering angle of the steering wheel 30 is used as a control parameter of the position controller 200 and the steering angle speed of the steering wheel 30 is used as a control parameter of the speed controller 300.

Meanwhile, when the first steering control method is switched to the second steering control method, an abrupt output change may occur as the control parameters are changed to act as a factor in reducing stability of the vehicle. Therefore, in the present embodiment, when the failure occurs in the motor angle sensor 20, instead of changing the control parameters of the position controller 200 and the speed controller 300 from the motor angle and the motor angle speed to the steering angle and the steering angle speed, the motor angle and the steering angle are blended for a predetermined time to be fed back to the position controller 200, and the motor angle speed and the steering angle speed are blended to be fed back to the speed controller 300 so that the above-described problem can be solved.

The processor 130 may determine a change amount per unit time for the first and second weight values on the basis of the steering angle speed of the steering wheel 30. Relationship information on the change amount per unit time according to the steering angle speed may be calculated in advance and stored in the memory 120, and the processor 130 may detect a change amount per unit time corresponding to the steering angle speed, which is output from the steering angle sensor 40, from the relationship information stored in the memory 120 and use the change amount per unit time. The change amount per unit time for the first and second weight values may be set to be larger as the steering angle speed increases.

Figure 3:
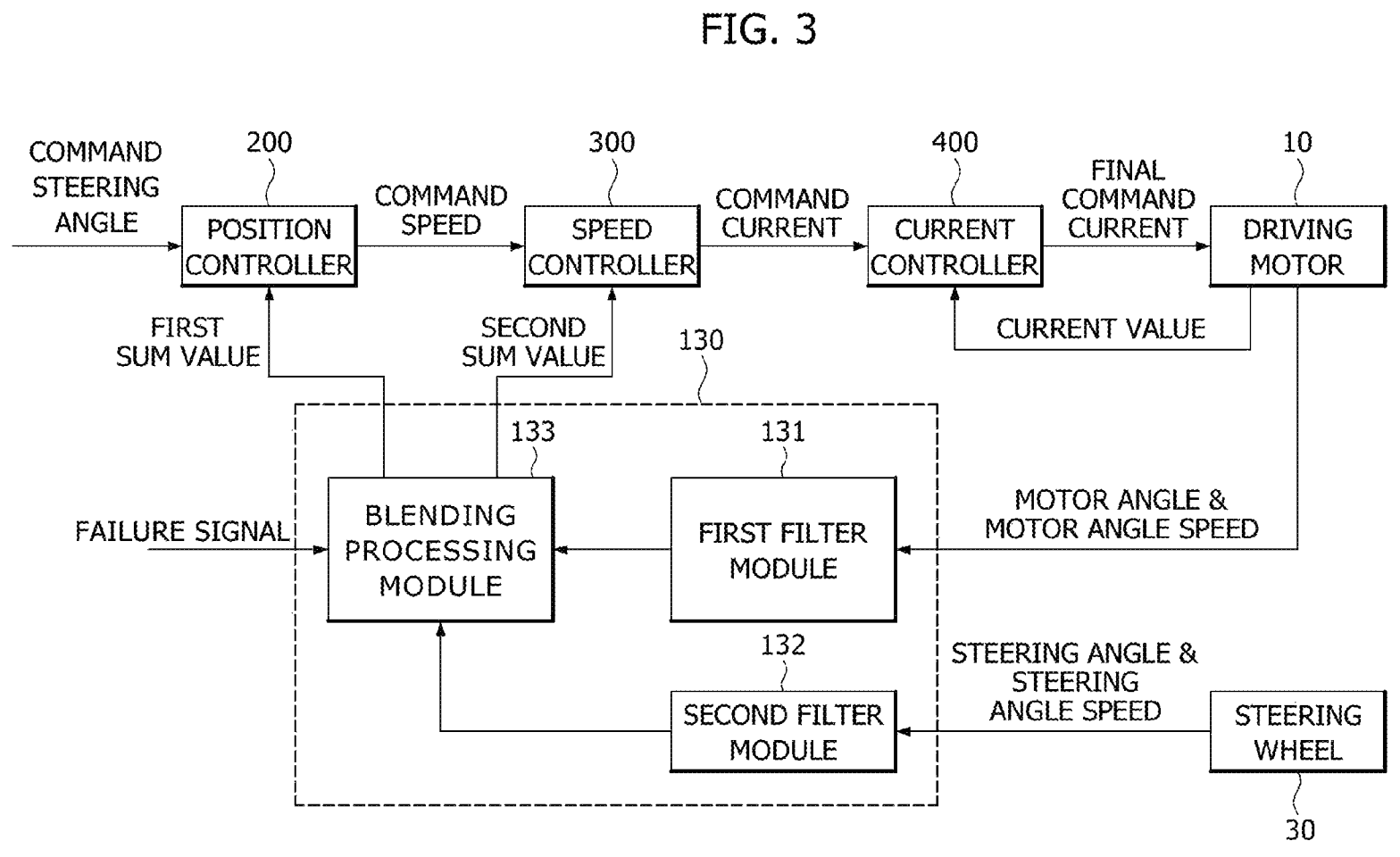

The processor 130 may determine a set time on the basis of the steering angle speed of the steering wheel 30 and calculate and feed back the first and second sum values while gradually changing the first and second weight values such that the first weight value becomes zero and the second weight value becomes one at a time point when the set time elapses from a time point at which a failure occurs in the motor angle sensor 20. Relationship information on the set time according to the steering angle speed may be calculated in advance and stored in the memory 120, and the processor 130 may detect a set time corresponding to the steering angle speed, which is output from the steering angle sensor 40, from the relationship information stored in the memory 120 and use the set time. The set time is a factor for determining a change amount per hour of the first and second weight values and may be set to be smaller as the steering angle speed increases. According to one embodiment, as shown in FIG. 3, the set time may be inversely proportional to the steering angle speed. According to one embodiment, the processor 130 may set the set time using the steering angle speed output from the steering angle sensor 40 at a time point when it is determined that a failure occurs in the motor angle sensor 20.

In a situation in which the failure occurs in the motor angle sensor 20, as the steering angle speed is large, the control parameters need to be switched more quickly. Therefore, in the present embodiment, when the steering angle speed is relatively large, the control parameters of the position controller 200 and the speed controller 300 are switched more quickly, and when the steering angle speed is relatively small, the control parameters of the position controller 200 and the speed controller 300 are switched more stably.

Meanwhile, the motor-driven power steering system to which the present embodiment is applied may include the position controller 200, the speed controller 300, a current controller 400, and the driving motor 10. The position controller 200 may calculate a command speed on the basis of a command steering angle provided from an external component (e.g., an autonomous driving system) and a value fed back by the processor 130. The position controller 200 may output the command speed by compensating for a difference (i.e., a steering angle error) between the command steering angle provided externally and the value fed back by the processor 130. The command speed may be output to the speed controller 300. The position controller 200 may be a proportional integral derivation (PID) controller, but the present disclosure is not limited thereto.

The speed controller 300 may calculate a command current on the basis of the command speed output from the position controller 200 and the value fed back by the processor 130. The speed controller 300 may output the command current by compensating for a difference (i.e., a steering angle speed error) between the command speed output from the position controller 200 and the value fed back by the processor 130. The command current may be output to the current controller 400. The speed controller 300 may be a PID controller, but the present disclosure is not limited thereto.

The current controller 400 may calculate a final command current on the basis of the command current output from the speed controller 300 and a current value of driving motor 10 detected through a current sensor and may output the calculated final command current to the driving motor 10. The current controller 400 may be a PID controller, but the present disclosure is not limited thereto.

FIG. 3 is a block diagram illustrating a processor according to one embodiment of the present disclosure.

Referring to FIG. 3, the processor 130 may include a first filter module 131, a second filter module 132, and a blending processing module 133. The modules in the embodiment are components responsible for some of the operations of the processor 130, which are classified according to a function, and an operation performed by each module may be understood as the operation performed by the processor 130.

The first filter module 131 may remove noise included in the motor angle and the motor angle speed of driving motor 10 output from the motor angle sensor 20. The first filter module 131 may be a low pass filter (LPF).

The second filter module 132 may remove noise included in the steering angle and the steering angle speed of the steering wheel 30 output from the steering angle sensor 40. The second filter module 132 may be an LPF.

When a failure does not occur in the motor angle sensor 20, the blending processing module 133 may feed the motor angle of the driving motor 10, which is output from the first filter module 131, back to the position controller 200, and feed the motor angle speed of the driving motor 10, which is output from the first filter module 131, back to the speed controller 300. When a driving signal is logic low, the blending processing module 133 may determine that the failure does not occur in the motor angle sensor 20.

When the failure occurs in the motor angle sensor 20, the blending processing module 133 may calculate a first sum value, which is the sum of a result value obtained by applying a first weight value to the motor angle of the driving motor 10 output from the first filter module 131 and a result value obtained by applying a second weight value to the steering angle of steering wheel 30 output from the second filter module 132, and feed the calculated first sum value back to the position controller 200. In addition, the blending processing module 133 may calculate a second sum value, which is the sum of a result value obtained by applying the first weight value to the motor angle speed of driving motor 10 output from the first filter module 131 and a result value obtained by applying the second weight value to the steering angle speed of the steering wheel 30 output from the second filter module 132, and feed the calculated second sum value back to the speed controller 300. When the driving signal is logic high, the blending processing module 133 may determine that the failure occurs in the motor angle sensor 20.

The blending processing module 133 may gradually reduce the first weight value until the first weight value becomes zero and calculate and feed back the first and second sum values. The blending processing module 133 may gradually increase the second weight value until second first weight value becomes one and calculate and feed back the first and second sum values. The blending processing module 133 may set the first weight value and the second weight value such that the sum of the first weight value and the second weight value is always one. An initial value of the first weight value may be set to one, and an initial value of the second weight value may be set to zero.

The blending processing module 133 may determine a decrease amount of the first weight value per unit time (or an increase amount of the second weight value per unit time) on the basis of the steering angle speed of the steering wheel 30. The blending processing module 133 may set the decrease amount of the first weight value per unit time (or the increase amount of the second weight value per time) to be larger as the steering angle speed of the steering wheel 30 increases.

After the second weight value reaches one, the blending processing module 133 may feed the steering angle of the steering wheel 30 output from the second filter module 132 back to the position controller 200 without separate blending processing and feed the steering angle speed of the steering wheel 30 output from the second filter module 132 back to the speed controller 300.

Figure 5:
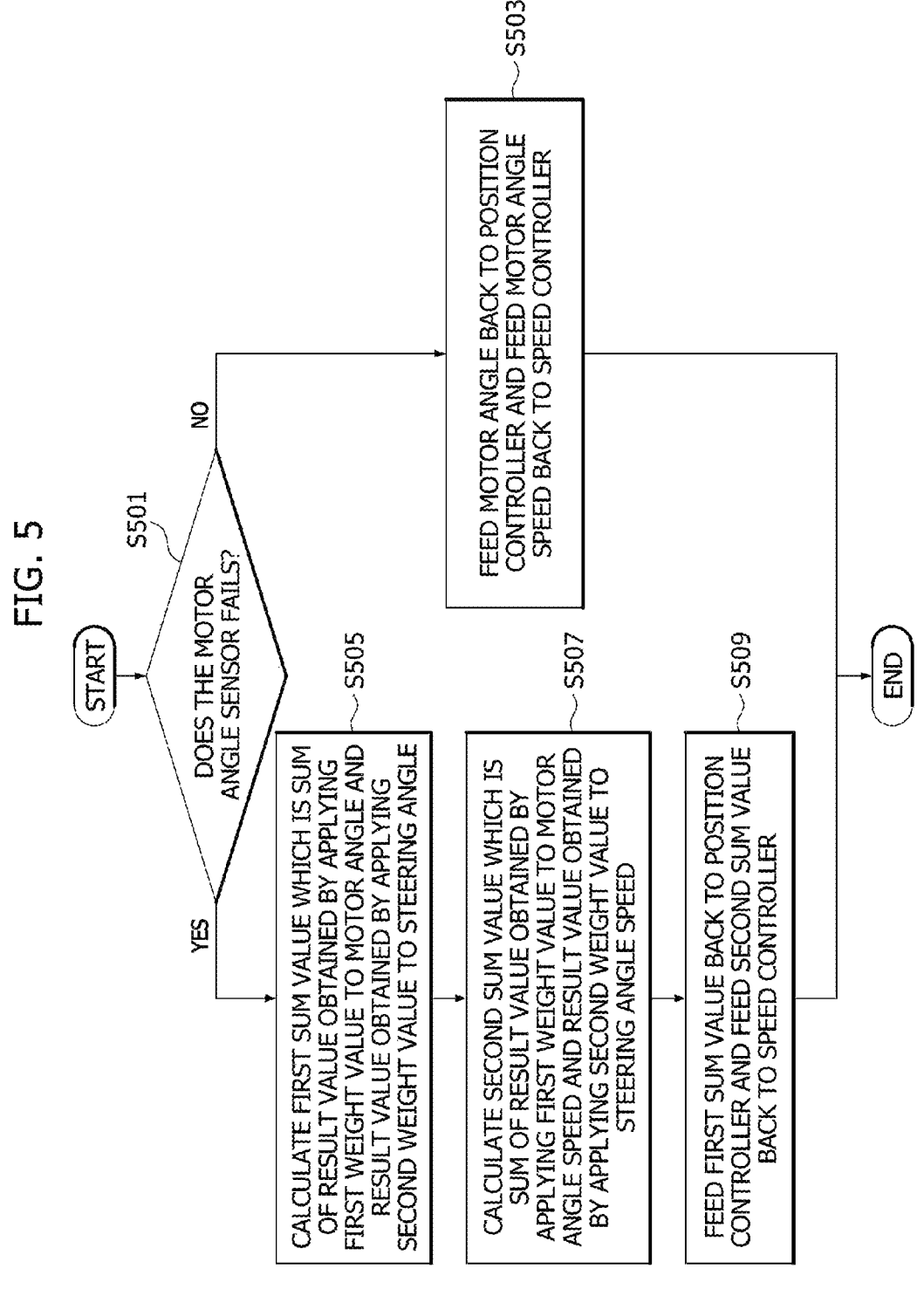
FIG. 5 is a flowchart illustrating a method of controlling a motor-driven power steering system according to one embodiment of the present disclosure.

FIG. 5 is a flowchart illustrating a method of controlling a motor-driven power steering system according to one embodiment of the present disclosure.

Hereinafter, the method of controlling a motor-driven power steering system according to one embodiment of the present disclosure will be described with reference to FIG. 5. Some of processes, which will be described below, may be performed in an order different from an order, which will be described below, or may be omitted.

First, the processor 130 may determine whether a failure occurs in the motor angle sensor 20 (S501). The processor 130 may determine whether the failure occurs in the motor angle sensor 20 on the basis of a failure signal received from an external component.

When the failure does not occur in the motor angle sensor 20, the processor 130 may feed a motor angle of the driving motor 10, which is output from the motor angle sensor 20, back to the position controller 200, and feed a motor angle speed of the driving motor 10, which is output from the motor angle sensor 20, back to the speed controller 300 (S503).

When the failure occurs in motor angle sensor 20, the processor 130 may calculate a first sum value, which is the sum of a result value obtained by applying a first weight value to the motor angle of the driving motor 10 output from the motor angle sensor 20 and a result value obtained by applying a second weight value to the steering angle of steering wheel 30 output from steering angle sensor 40 (S505).

Subsequently, the processor 130 may calculate a second sum value, which is the sum of a result value obtained by applying the first weight value to a motor angle speed of driving motor 10 output from motor angle sensor 20 and a result value obtained by applying the second weight value to a steering angle speed of steering wheel 30 output from steering angle sensor 40 (S507). Operation S507 may be performed with operation S505 in parallel.

Subsequently, the processor 130 may feed the first sum value calculated in operation S505 back to the position controller 200 and feed the second sum value calculated in operation S507 back to the speed controller 300 (S509). The processor 130 may repeatedly perform operations S505 to S509 while gradually decreasing the first weight value and gradually increasing the second weight value. These processes may be repeated until the first weight value becomes zero and the second weight value becomes one. Then, the processor 130 may feed the steering angle and the steering angle speed of the steering wheel 30 output from the steering angle sensor 40 back to the position controller 200 and the speed controller 300. In this case, the processor 130 may determine a time required for the first weight value to become zero and the second weight value to become one, that is, a set time, on the basis of the steering angle speed of the steering wheel 30.

As described above, according to the apparatus and method for controlling a motor-driven power steering system according to one embodiment of the present disclosure, when a failure occurs in the motor angle sensor, the motor angle-based steering control is switched to the steering angle-based steering control so that it is possible to secure stable steering control of the vehicle even when a failure occurs in the motor angle sensor. In addition, according to the apparatus and method for controlling a motor-driven power steering system according to one embodiment of the present disclosure, the motor angle-based steering control is stably switched to the steering angle-based steering control so that an unstable factor such as vibration that may occur during the switching process from motor angle sensor-based steering control to steering angle sensor-based steering control can be minimized.

Implementations described herein may also be implemented by, for example, a method or process, an apparatus, a software program, a data stream, or a signal. Even when only discussed in the context in a single form of implementation (e.g., discussed only as a method), the implementation of features discussed may also be implemented in other forms (e.g., an apparatus or program). The apparatus may be implemented in suitable hardware, software, and firmware. The method may be implemented in an apparatus such as a processor, which is generally referred to as a processing device including, for example, a computer, a microprocessor, an integrated circuit, or a programmable logic device. The processor also includes communication devices such as computers, cellular phones, portable/personal digital assistants ("PDAs"), and other devices that facilitate information communication of between end-users.

In accordance with the present disclosure, when a failure occurs in a motor angle sensor, motor angle-based steering control is switched to steering angle-based steering control so that it is possible to secure stable steering control of a vehicle even when a failure occurs in the motor angle sensor.

In accordance with the present disclosure, the motor angle-based steering control is stably switched to the steering angle-based steering control so that an unstable factor such as vibration that may occur during the switching process from the motor angle-based steering control to the steering sensor-based steering control can be minimized.

Meanwhile, it should be noted that effects of the present disclosure are not limited to the above described effect, and other effects of the present disclosure not mentioned above can be clearly understood by those skilled in the art from the above description.

While the present disclosure has been described with reference to the embodiments shown in the drawings, these embodiments are merely illustrative and it should be understood that various modifications and equivalent other embodiments can be derived by those skilled in the art on the basis of the embodiments. Therefore, the true technical scope of the present disclosure should be defined by the appended claims.

What is claimed is:

1. An apparatus for controlling a motor-driven power steering system, the apparatus comprising:

an input/output interface communicatively connected to a motor angle sensor, a steering angle sensor, and a position controller, wherein the motor-driven power steering system includes the motor angle sensor, the steering angle sensor, and the position controller, and a driving motor; and a processor communicatively connected to the input/output interface and the position controller operatively connected to the driving motor, wherein, based on a failure occurring in the motor angle sensor, the processor determines a first sum value of a result value obtained by applying a first weight value to a motor angle of the driving motor output from the motor angle sensor and a result value obtained by applying a second weight value to a steering angle of a steering wheel output from the steering angle sensor communicatively connected to the processor and controls the driving motor of the motor-driven power steering system by feeding the first sum value back to the position controller.

2. The apparatus of claim 1, wherein:

the input/output interface is communicatively connected to a speed controller communicatively connected to the position controller; and based on the failure occurring in the motor angle sensor, the processor determines a second sum value of a result value obtained by applying the first weight value to a motor angle speed of the driving motor output from the motor angle sensor and a result value obtained by applying the second weight value to a steering angle speed of the steering wheel output from the steering angle sensor, and feeds the second sum value back to the speed controller.

3. The apparatus of claim 1, wherein an initial value of the first weight value is one, and wherein the processor reduces the first weight value until the first weight value becomes zero.

4. The apparatus of claim 3, wherein an initial value of the second weight value is zero, and wherein the processor increases the second weight value until the second weight value becomes one.

5. The apparatus of claim 4, wherein the processor sets the first weight value and the second weight value so that a sum of the first weight value and the second weight value is one.

6. The apparatus of claim 4, wherein the processor sets change amounts of change per unit time for the first and second weight values based on a steering angle speed of the steering wheel.

7. The apparatus of claim 6, wherein the processor sets change amounts per unit time to be larger as the steering angle speed of the steering wheel increases.

8. The apparatus of claim 6, wherein a set time for determining the change amounts per unit time of the first and second weight values is inversely proportional to the steering angle speed.

9. The apparatus of claim 1, wherein, based on the failure not occurring in the motor angle sensor, the motor angle of the driving motor output from the motor angle sensor is fed back to the position controller, and a motor angle speed of the driving motor output from the motor angle sensor is fed back to a speed controller.

10. A method of controlling a motor-driven power steering system, which is performed in a computing device including a processor, the method comprising:

based on a failure occurring in a motor angle sensor communicatively connected to the processor, determining, by the processor, a first result value by applying a first weight value to a motor angle of a driving motor output from the motor angle sensor;

determining, by the processor, a second result value by applying a second weight value to a steering angle of a steering wheel output from a steering angle sensor communicatively connected to the processor; and determining, by the processor, a first sum value of the first and second result values; and controlling, by the processor, the driving motor of the motor-driven power steering system by feeding the first sum value back to a position controller communicatively connected to the processor and operatively connected to the driving motor.

11. The method of claim 10, further comprising:

determining, by the processor, a third result value by applying the first weight value to a motor angle speed of the driving motor output from the motor angle sensor;

determining, by the processor, a fourth result value by applying the second weight value to a steering angle speed of the steering wheel output from the steering angle sensor; and determining, by the processor, a second sum value of the third and fourth result values and feeding the second sum value back to a speed controller communicatively connected to the position controller.

12. The method of claim 11, wherein an initial value of the first weight value is one, and wherein the processor reduces the first weight value until the first weight value becomes zero.

13. The method of claim 12, wherein an initial value of the second weight value is zero, and wherein the processor increases the second weight value until the second weight value becomes one.

14. The method of claim 13, wherein the processor sets the first weight value and the second weight value so that a sum of the first weight value and the second weight value is one.

15. The method of claim 13, wherein the processor sets change amounts of change per unit time for the first and second weight values based on the steering angle speed of the steering wheel.

16. The method of claim 15, wherein the processor sets the change amounts per unit time to be larger as the steering angle speed of the steering wheel increases.

17. The method of claim 15, wherein a set time for determining the change amounts per unit time of the first and second weight values is inversely proportional to the steering angle speed.

18. The method of claim 11, wherein, based on the failure not occurring in the motor angle sensor, the motor angle of the driving motor output from the motor angle sensor is fed back to the position controller, and a motor angle speed of the driving motor output from the motor angle sensor is fed back to the speed controller.

19. A non-transitory computer readable storage medium on which a program for performing the method of claim 10 is recorded.

* * * * *